(12) United States Patent
Shan

(10) Patent No.: US 10,827,341 B2
(45) Date of Patent: Nov. 3, 2020

(54) METHOD OF ENVIRONMENTAL SENSING THROUGH PILOT SIGNALS IN A SPREAD SPECTRUM WIRELESS COMMUNICATION SYSTEM

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 112 days.

(21) Appl. No.: 16/252,257

(22) Filed: Jan. 18, 2019

(65) Prior Publication Data

US 2019/0222996 A1    Jul. 18, 2019

Related U.S. Application Data

(63) Continuation-in-part of application No. 16/248,761, filed on Jan. 15, 2019, and a continuation-in-part of
(Continued)

(51) Int. Cl.
| | |
|---|---|
| *H04W 8/00* | (2009.01) |
| *H04B 1/713* | (2011.01) |
| *H04B 7/0413* | (2017.01) |
| *G01S 7/00* | (2006.01) |
| *G01S 19/13* | (2010.01) |

(Continued)

(52) U.S. Cl.
CPC ........... *H04W 8/005* (2013.01); *G01S 5/0072* (2013.01); *G01S 5/12* (2013.01); *G01S 7/006* (2013.01); *G01S 11/08* (2013.01); *G01S 19/13* (2013.01); *H04B 1/707* (2013.01); *H04B 1/713* (2013.01); *H04B 7/0413* (2013.01);
(Continued)

(58) Field of Classification Search
CPC ...... H04W 8/005; H04W 48/12; H04B 1/707; H04B 1/713; H04B 7/0413; H04J 13/0022; G01S 11/08; G01S 5/12; G01S 5/0072; G01S 7/006; G01S 19/13
USPC ................................ 342/107, 104, 109, 124
See application file for complete search history.

(56) References Cited

U.S. PATENT DOCUMENTS

| | | | |
|---|---|---|---|
| 2007/0202809 A1* | 8/2007 | Lastinger et al. | ....... H04B 1/00 455/63.4 |
| 2014/0206367 A1* | 7/2014 | Agee | ................. H04W 28/0236 455/450 |

(Continued)

*Primary Examiner* — Bo Fan

(57) ABSTRACT

A method of environmental sensing through pilot signals in a spread spectrum wireless communication system is provided with a plurality of wireless terminals. The plurality of wireless terminals includes a plurality of multi-input multi-output (MIMO) radars and at least one base station. The plurality of terminals broadcasts a beacon pilot signals containing a terminal-specific information and encoded with a corresponding identifier. Using the corresponding identifier, an arbitrary radar from the plurality of MIMO radars separates the beacon pilot signal from an ambient signal. More specifically, the arbitrary radar compares the ambient signal to the corresponding identifier of each wireless terminal to identify at least one origin terminal. Subsequently, the arbitrary radar extracts the terminal-specific information from the beacon pilot signal of the origin terminal. The terminal-specific information is used to exchange data between the plurality of wireless terminals for autonomous driving.

10 Claims, 16 Drawing Sheets

Related U.S. Application Data application No. 16/242,958, filed on Jan. 8, 2019, and a continuation-in-part of application No. 16/249,351, filed on Jan. 16, 2019.

(60) Provisional application No. 62/617,962, filed on Jan. 16, 2018, provisional application No. 62/616,844, filed on Jan. 12, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018, provisional application No. 62/756,318, filed on Nov. 6, 2018, provisional application No. 62/617,723, filed on Jan. 16, 2018.

(51) Int. Cl.
*H04W 48/12* (2009.01)
*H04B 1/707* (2011.01)
*H04J 13/00* (2011.01)
*G01S 11/08* (2006.01)
*G01S 5/12* (2006.01)
*G01S 5/00* (2006.01)
*H04W 4/40* (2018.01)

(52) U.S. Cl.
CPC ......... *H04J 13/0022* (2013.01); *H04W 48/12* (2013.01); *H04B 2201/70701* (2013.01); *H04W 4/40* (2018.02)

(56) References Cited

U.S. PATENT DOCUMENTS

2016/0080175 A1* 3/2016 Huang .................... H04L 25/02 375/267
2017/0033856 A1* 2/2017 Su et al. .................. H04B 7/06

\* cited by examiner

Estimating a time delay between the origin terminal and the arbitrary terminal with the arbitrary terminal after step (E) by counting a PN shift number for the frequency spectrum of the beacon pilot beam of the origin terminal

METHOD OF ENVIRONMENTAL SENSING THROUGH PILOT SIGNALS IN A SPREAD SPECTRUM WIRELESS COMMUNICATION SYSTEM

The current application claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/619,204 filed on Jan. 19, 2018.

The current application also claims a priority to the U.S. Provisional Patent application Ser. No. 62/628,436 filed on Feb. 9, 2018.

The current application also claims a priority to the U.S. Provisional Patent application Ser. No. 62/630,416 filed on Feb. 14, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention generally relates to a method of environmental sensing through pilot signals in a spread spectrum wireless communication system. More specifically, the present invention enables a plurality of wireless terminals to exchange location, safety information, road conditions, and the like to enable a vehicle-to-everything network for automatic driving.

BACKGROUND OF THE INVENTION

Vehicle wireless communication networks and auto radar for automatic driving vehicle have been fast-growing areas of interest for many automobile and wireless enterprises. These markets are among fastest growing markets in the world.

Recently, the development of automobile radar as a sensing tool for advanced driver assistance systems (ADAS) and autonomous driving is the focus of automobile manufactures and the artificial intelligence (AI) research and development industry.

Vehicle communication networks such as Vehicle-to-Everything (V2X) are a driving force behind the 5G, 4G-LTE and WiGig mobile standards, product developments, and applications. A V2X network connects vehicles with the surrounding communication nodes such as ground points, pedestrians, mobile or static base stations, and/or traffic infrastructure such as police stations, toll booth, traffic lights, etc.

With the growth of the auto radar market, more automobiles with radar functions will propagate on the roads. Radar signals can often interfere with one another and hinder vehicle's ability to sense targets. Therefore, a new anti-jammer radar is needed.

As herein used, V2X represents vehicles to everything (vehicles, ground point, Internet, police station, toll booth, etc.) communication. Further, each communication node in the V2X network contains a wireless terminal for sending and receiving the signals.

The present invention introduces a spread spectrum V2X system that provides a solution to the interference between the wireless terminals. Further, the spread spectrum coding provides vehicles location, identification, and a powerful tool for environmental sensing for V2X communication and automatic driving applications.

DETAILED DESCRIPTION OF THE INVENTION

All illustrations of the drawings are for the purpose of describing selected versions of the present invention and are not intended to limit the scope of the present invention.

Figure 1:
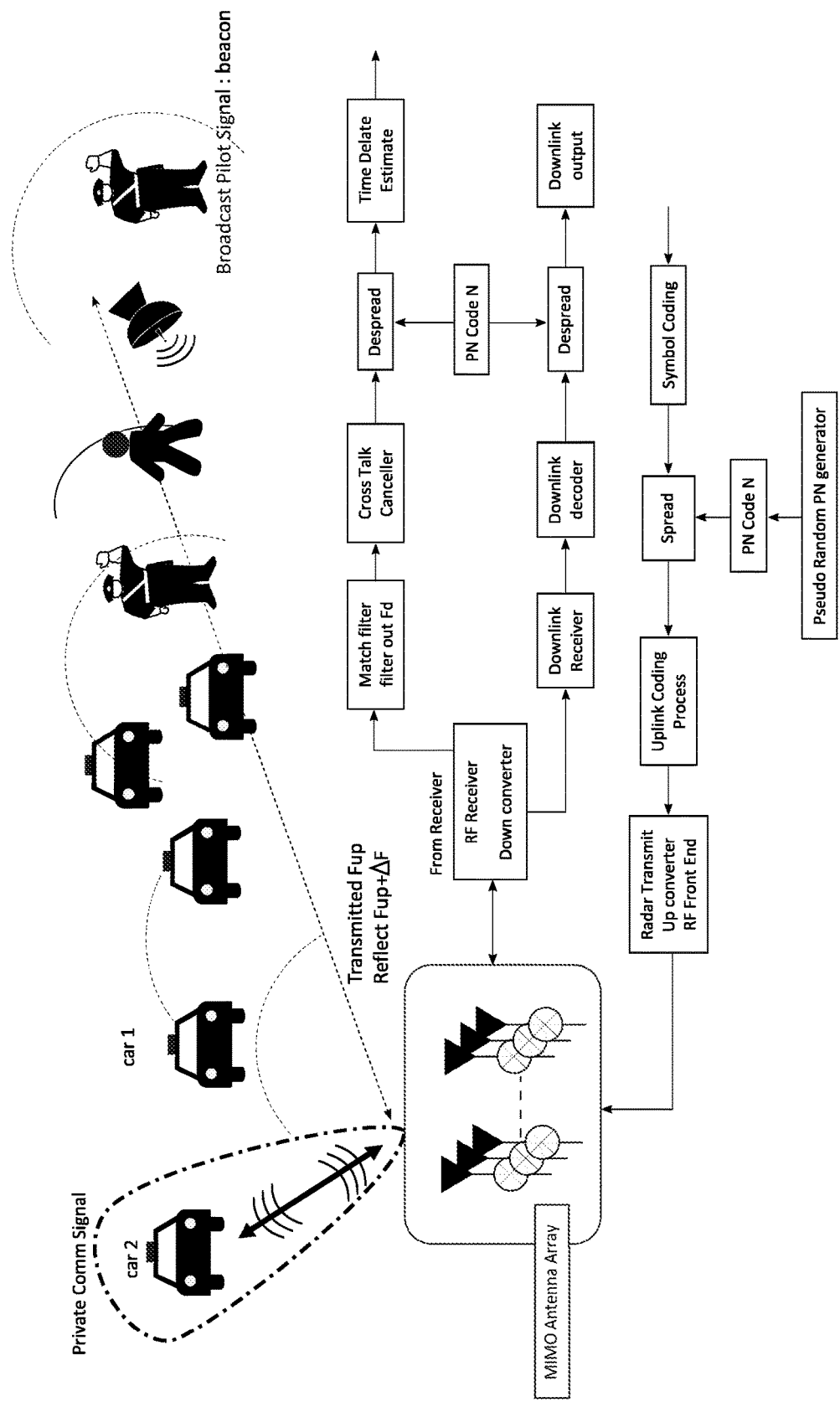
FIG. 1 is a schematic diagram of the system of the present invention.
Figure 2:
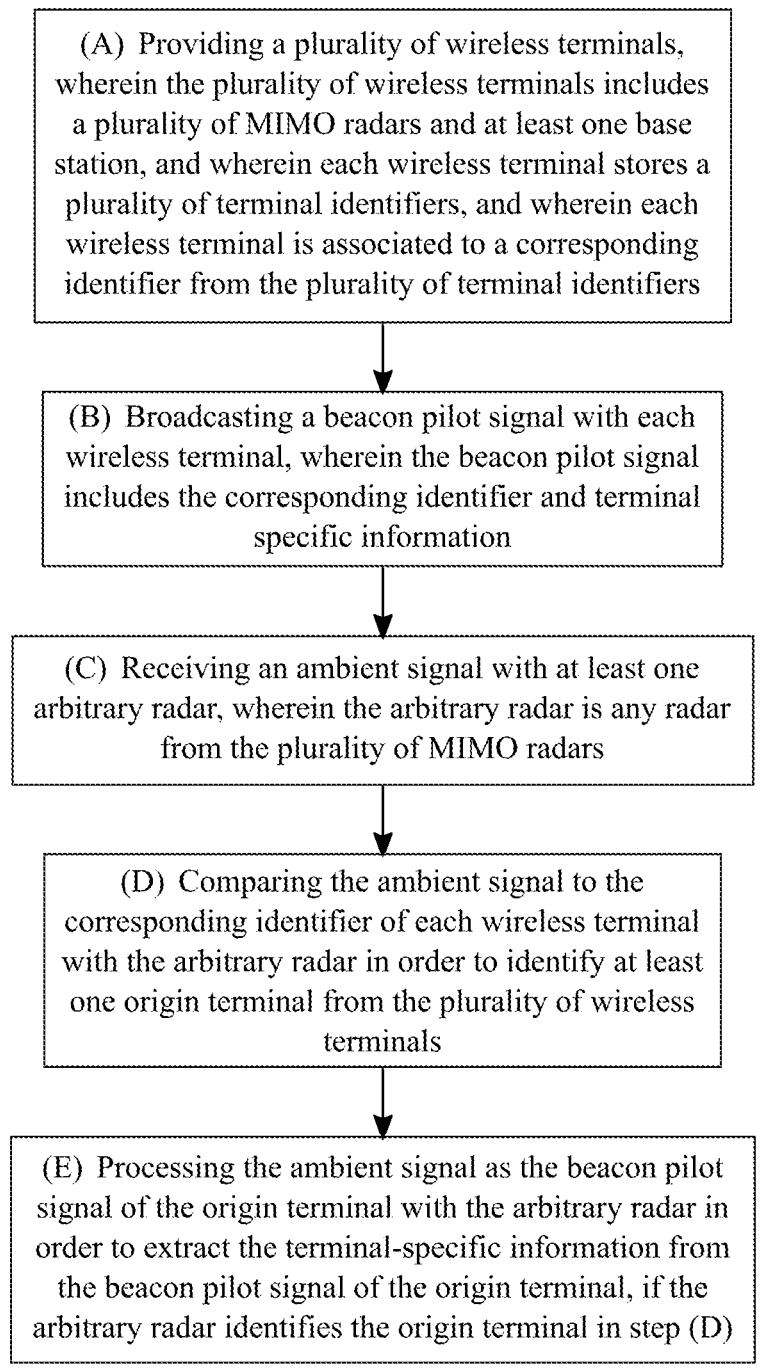
FIG. 2 is a flowchart of the overall process for the method of the present invention.

Referring to FIG. 1 and FIG. 2, the present invention is a method of environmental sensing through pilot signals in a spread spectrum wireless communication system. The present invention is provided with a plurality of wireless terminals, wherein the plurality of wireless terminals includes a plurality of multi-input multi-output (MIMO) radars and at least one base station, and wherein each wireless terminal stores a plurality of terminal identifiers, and wherein each wireless terminal is associated to a corresponding identifier from the plurality of terminal identifiers (Step A). The preferred MIMO radar is an advanced type of phased array radar comprising a plurality of antenna arrays, each of which can be independently directed. In the preferred implementation, the MIMO radar is provided as part of a vehicle's advanced driver assistance system (ADAS) or autonomous driving systems. In particular, the preferred MIMO radar serves a dual-purpose role as a networking device for connecting to base stations and wireless terminals and as a conventional radar for generating speed, distance, and DOA estimates for a plurality of targets. The preferred base station is a fixed or mobile communication platform to the plurality of wireless terminals.

The overall process of the invention entails transmitting an encrypted beacon pilot signal from the plurality of wireless terminals to exchange location, emergency information, and communication information (Step B through Step E). Subsequently, each wireless terminal broadcasts a beacon pilot signal, wherein the beacon pilot signal includes the corresponding identifier and terminal-specific information (Step B). The beacon pilot signal is used to broadcast basic information about the corresponding wireless terminal. Preferably, each of the plurality terminals identifiers is used to encrypt a corresponding beacon pilot signal. Thus, each wireless terminal can use the stored plurality of terminal identifiers to identify the corresponding beacon pilot signal. In the preferred embodiment, the beacon pilot signal for each wireless terminal is encrypted using spread spectrum techniques to overcome channel noise and jamming signals. The spread spectrum technique spreads the frequency domain of the beacon pilot signal to overcome channel noise and jamming signal. This allows the beacon pilot signal to reliably transmit the terminal specific information related to the corresponding wireless terminal. The terminal specific information refers to basic information about the corresponding terminal such as the location, identification, and the like. For example, the terminal-specific information of a MIMO radar may include, but is not limited to, the location, global positioning system (GPS) coordinates, speed, emergency messages, car identification information, and the like of the vehicle. In some embodiments of the present invention, the spread spectrum techniques may include frequency-hopping spread spectrum (FHSS), direct-sequence spread spectrum (DSSS), time-hopping spread spectrum (THSS), chirp spread spectrum (CSS), and/or combinations of these techniques.

Figure 3:
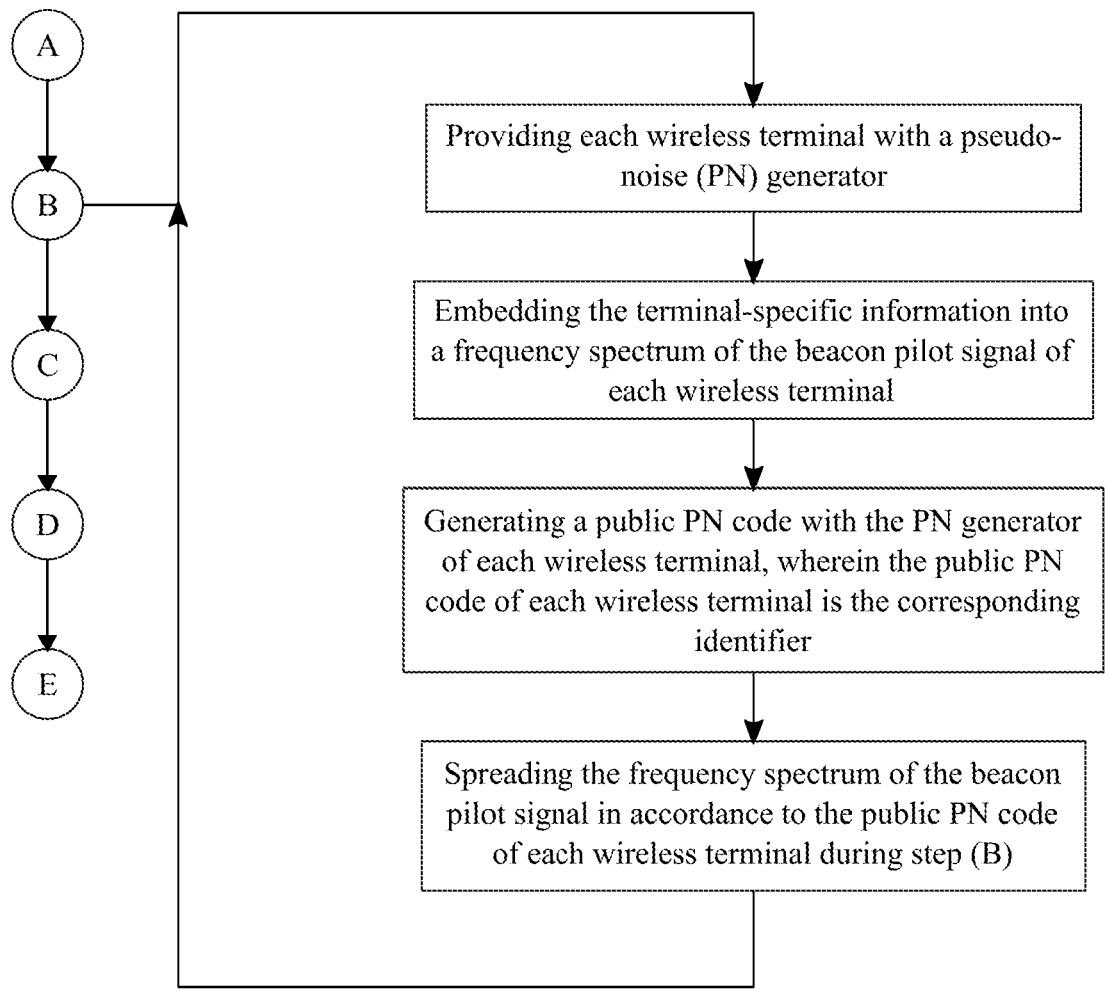
FIG. 3 is a flowchart of a subprocess for using a public PN code to spread the frequency spectrum of the beacon pilot signal.
Figure 5:
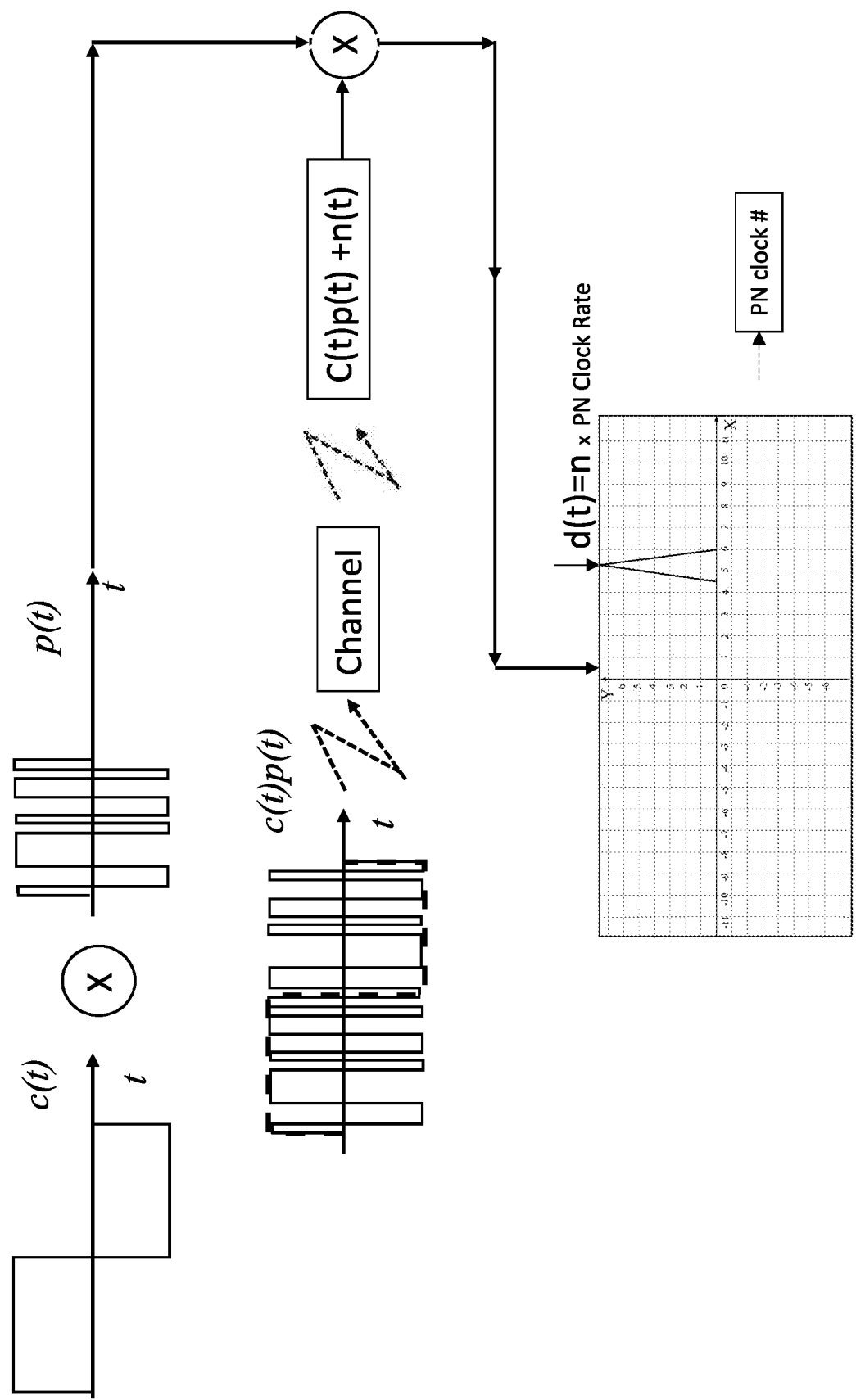
FIG. 5 is an illustration showing the PN code spreading and de-spreading process.

Referring to FIG. 3 and FIG. 5, in the preferred embodiment, each MIMO radar operates as a passive radar by constantly listening for a beacon pilot signal from at least one of the plurality of MIMO radars. Preferably, the preferred beacon pilot signal adheres to 5G mobile standard enabling high speed communication between the MIMO radar and the base station. Accordingly, at least one arbitrary radar receives an ambient signal, wherein the arbitrary radar is any radar from the plurality of MIMO radars (Step C). More specifically, the ambient signal includes each of the beacon pilot signal transmitted by the plurality of wireless terminals, as well as any stray signals surrounding the vehicle. As such, the arbitrary radar compares the ambient signal to the corresponding identifier of each wireless terminal in order to identify at least one origin terminal from the plurality of wireless terminals (Step D). In the preferred embodiment, the arbitrary radar filters the ambient signal according to a plurality of terminal identifiers. More specifically, the arbitrary radar correlates the ambient signal to the plurality of terminal identifiers to identify at least one beacon pilot signal. In this embodiment, the wireless terminal transmitting the beacon pilot signal is designated as the origin terminal. Finally, the arbitrary radar processes the ambient signal as the beacon pilot signal of the origin terminal in order to extract the terminal-specific information from the beacon pilot signal of the origin terminal, if the arbitrary radar identifies the origin terminal in Step D (Step E).

In the preferred embodiment, each wireless terminal is provided with a PN generator for generating a PN code. In this embodiment, the PN code is the terminal identifier. As such, each wireless terminal includes a plurality of PN codes wherein each PN code is associated to a corresponding wireless terminal. The PN code transforms the plurality of transmitted beams into a signal similar to noise which is resistant to jamming and can only be identified with another radar with the PN code. This allows the wireless terminal to transmit the terminal-specific information reliably. As such, each wireless terminal embeds the terminal-specific information into a frequency spectrum of the beacon pilot signal. Subsequently, the PN generator of each wireless terminal generates the public PN code, wherein the public PN code of each wireless terminal is the corresponding identifier. Preferably, each wireless terminal stores the public PN code of the plurality of wireless terminals, thereby allowing each wireless terminal to correctly identify the beacon pilot signal and the corresponding wireless terminal. Subsequently, each wireless terminal spreads the frequency spectrum of the beacon pilot in accordance to the public PN code of each wireless terminal during Step B.

Figure 4:
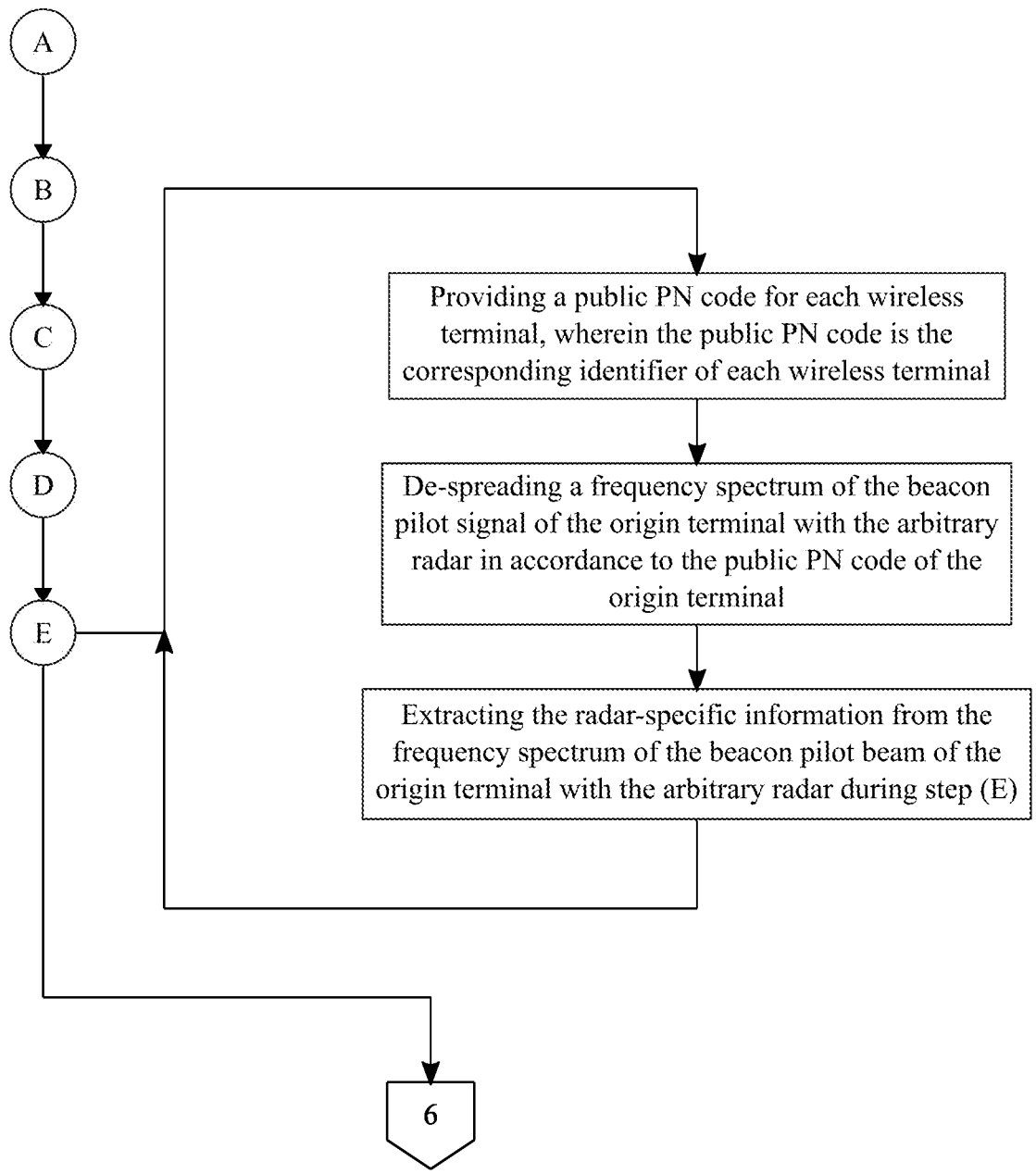
FIG. 4 is a flowchart of a subprocess for de-spreading a frequency spectrum of the beacon pilot signal to extract radar-specific information.

Referring to FIG. 4 and FIG. 5, on the receiving side of the preferred embodiment, the PN code is used to both separate and identify the beacon pilot signal from the ambient signal. This allows the arbitrary radar to identify an origin terminal. This may be achieved by filtering the ambient signal according to the PN code to identify the beacon pilot signal. Once identified, the arbitrary radar de-spreads a frequency spectrum of the beacon pilot signal of the origin terminal with the arbitrary radar in accordance to the public PN code of the origin terminal. This allows the arbitrary radar to extract the radar-specific information from the frequency spectrum of the beacon pilot beam of the origin terminal during Step E. In one possible embodiment, the terminal-specific information may be used to derive the location of the origin terminal. For example, in a MIMO radar, the terminal-specific information may include the GPS coordinates, whereby the arbitrary radar is able to derive the location of the accompanying vehicle.

Figure 6:
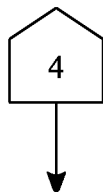
FIG. 6 is a flowchart of a subprocess for estimating the time delay between the origin terminal and the arbitrary terminal by counting a PN shift number.

Referring to FIG. 6, also in the preferred embodiment, the beacon pilot signal can also be used to calculate a time delay. Accordingly, the arbitrary terminal estimates a time delay between the origin terminal and the arbitrary terminal after Step E by counting a PN shift number for the frequency spectrum of the beacon pilot beam of the origin terminal. The PN shift number is the shift between the PN code as measured by the clock of the arbitrary terminal and the received beacon pilot signal. By measuring the PN shift number, the arbitrary radar is able to determine the distance traveled by the beacon pilot signal and thus derive the location of the origin terminal.

Figure 7:
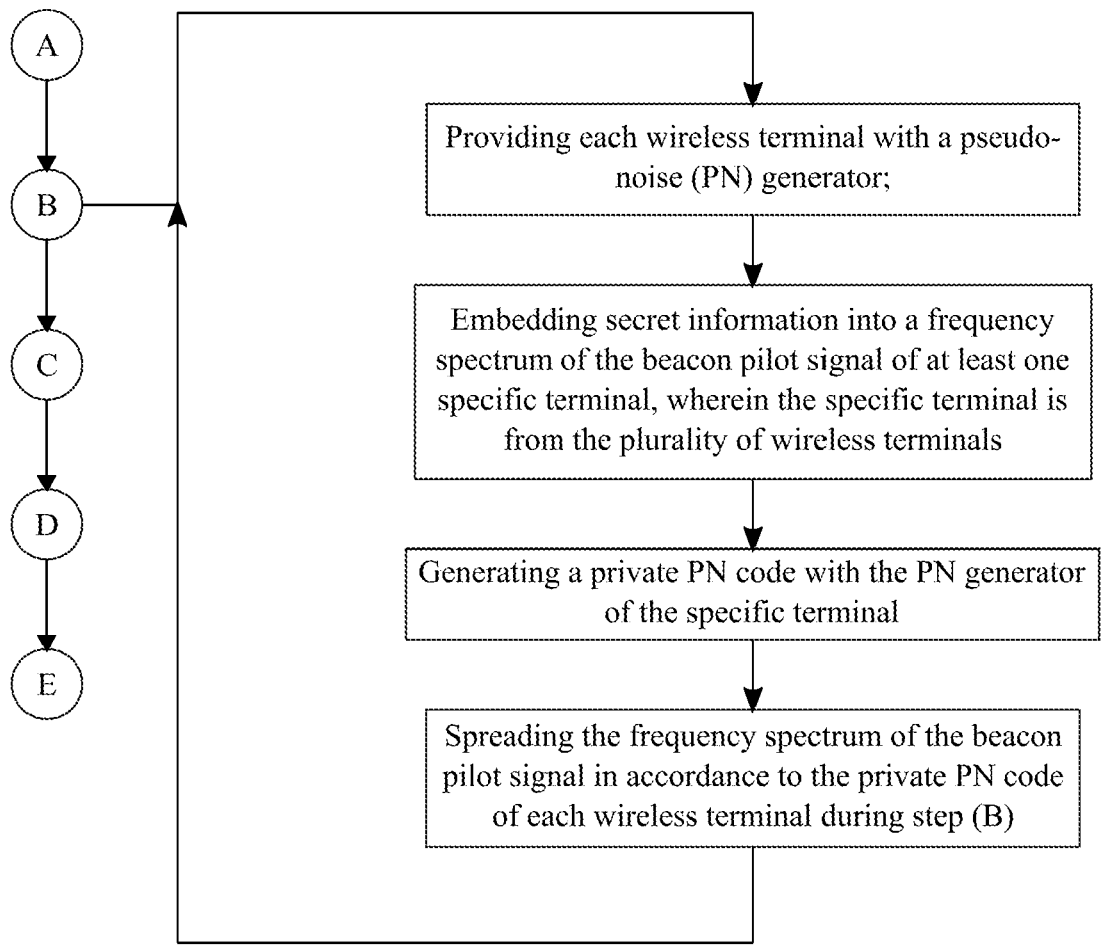
FIG. 7 is a flowchart of a subprocess for spreading the frequency spectrum of the beacon pilot signal with the private PN code.
Figure 8:
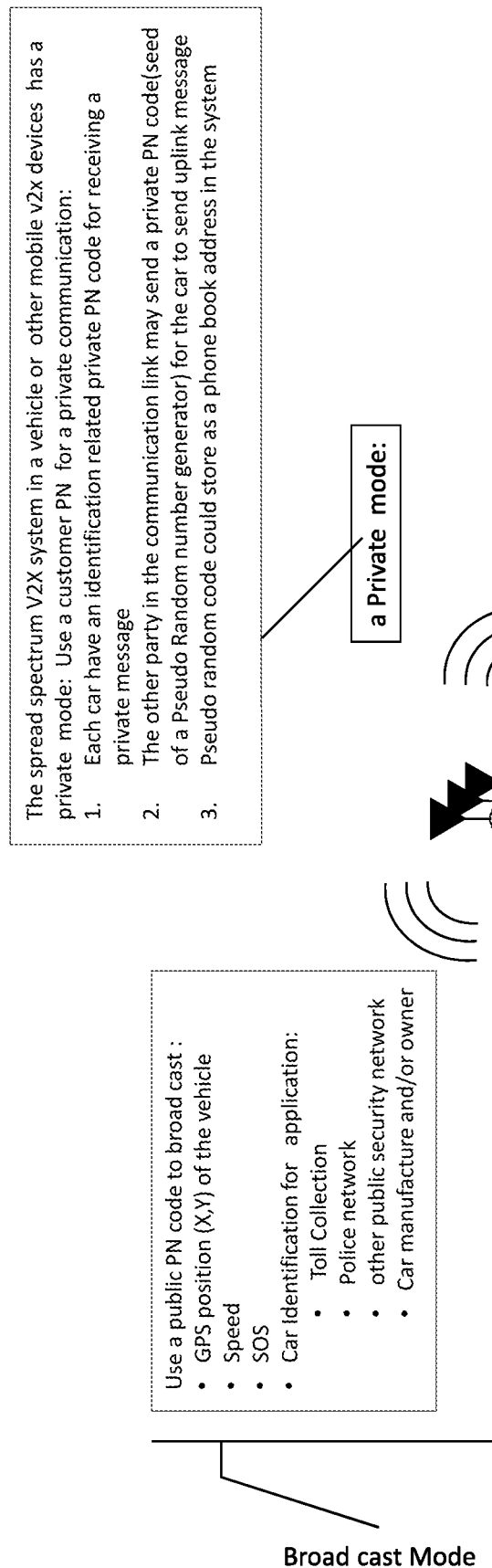
FIG. 8 is an illustration showing the wireless terminal broadcasting the beacon pilot signal using the private PN code.

Referring to FIG. 7 and FIG. 8, in another possible embodiment, a private network is enabled between the plurality of wireless terminals. As such, at least one specific terminal embeds secret information into a frequency spectrum of the beacon pilot signal, wherein the specific terminal is from the plurality of wireless terminals. The secret information kept hidden from the plurality of wireless terminals and only revealed to the specific terminal. Further, the specific terminal generates a private PN code with the PN generator of the specific terminal. Preferably, the private PN code is included in the terminal-specific information sent to the specific terminal by the origin terminal. Accordingly, the specific terminal spreads the frequency spectrum of the beacon pilot signal in accordance to the private PN code of each wireless terminal during Step B. A beacon pilot signal encrypted with the private PN code can only be identified and decoded by a wireless terminal with the private PN code.

Figure 9:
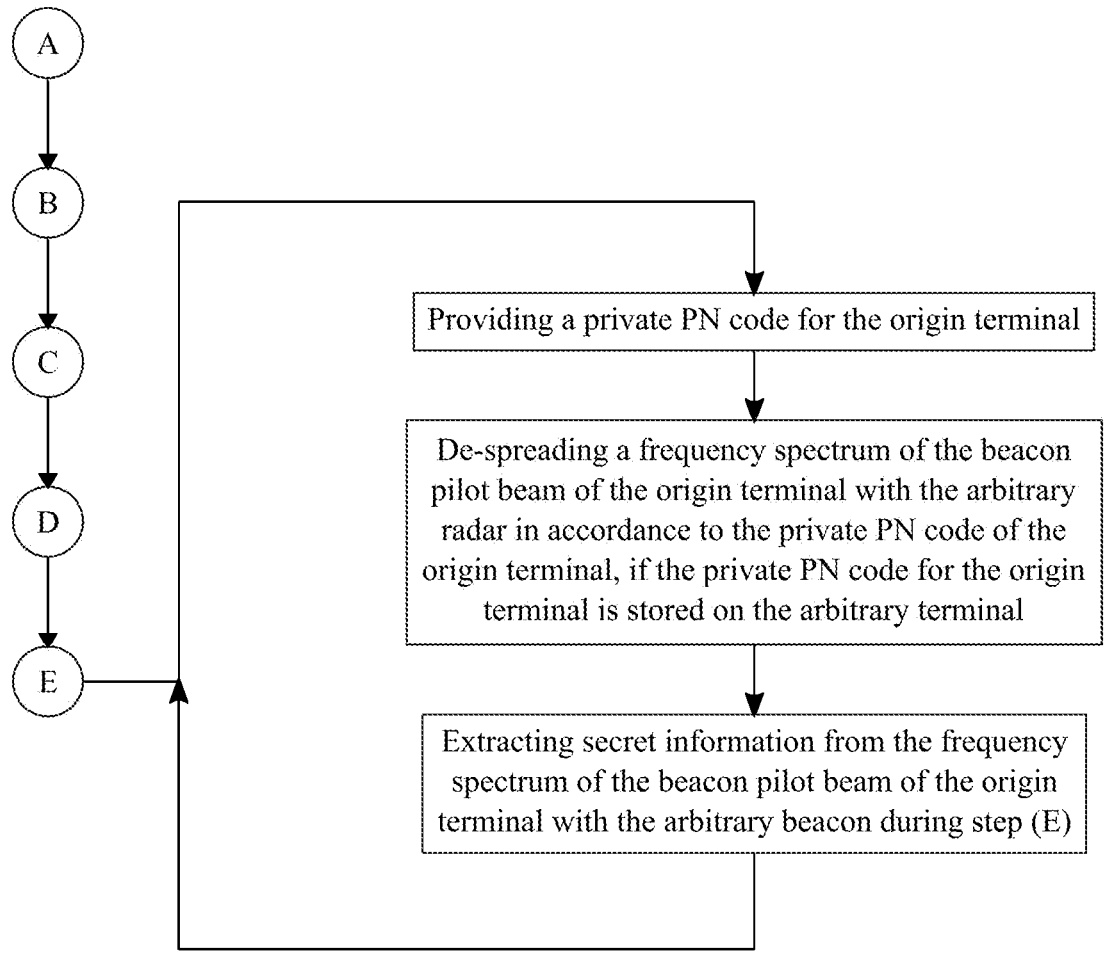
FIG. 9 is a flowchart of a subprocess for de-spreading the frequency spectrum of the beacon pilot beam with the private PN code.

Referring to FIG. 7 and FIG. 9, on the receiving side of the other embodiment, an arbitrary terminal uses the private PN code to decrypt the beacon pilot signal and extract the secret information. As such, the private PN code for the origin terminal is provided. By filtering the ambient signal with the private PN code, the arbitrary radar detects the beacon pilot beam from the origin terminal. Accordingly, the arbitrary radar de-spreads a frequency spectrum of the beacon pilot beam of the origin terminal in accordance to the private PN code of the origin terminal, if the private PN code for the origin terminal is stored on the arbitrary terminal. In one possible embodiment of the present invention, the private PN code may be identified and de-spread simultaneously. Further, the arbitrary radar extracts the secret information from the frequency spectrum of the beacon pilot beam of the origin terminal during Step E.

Figure 10:
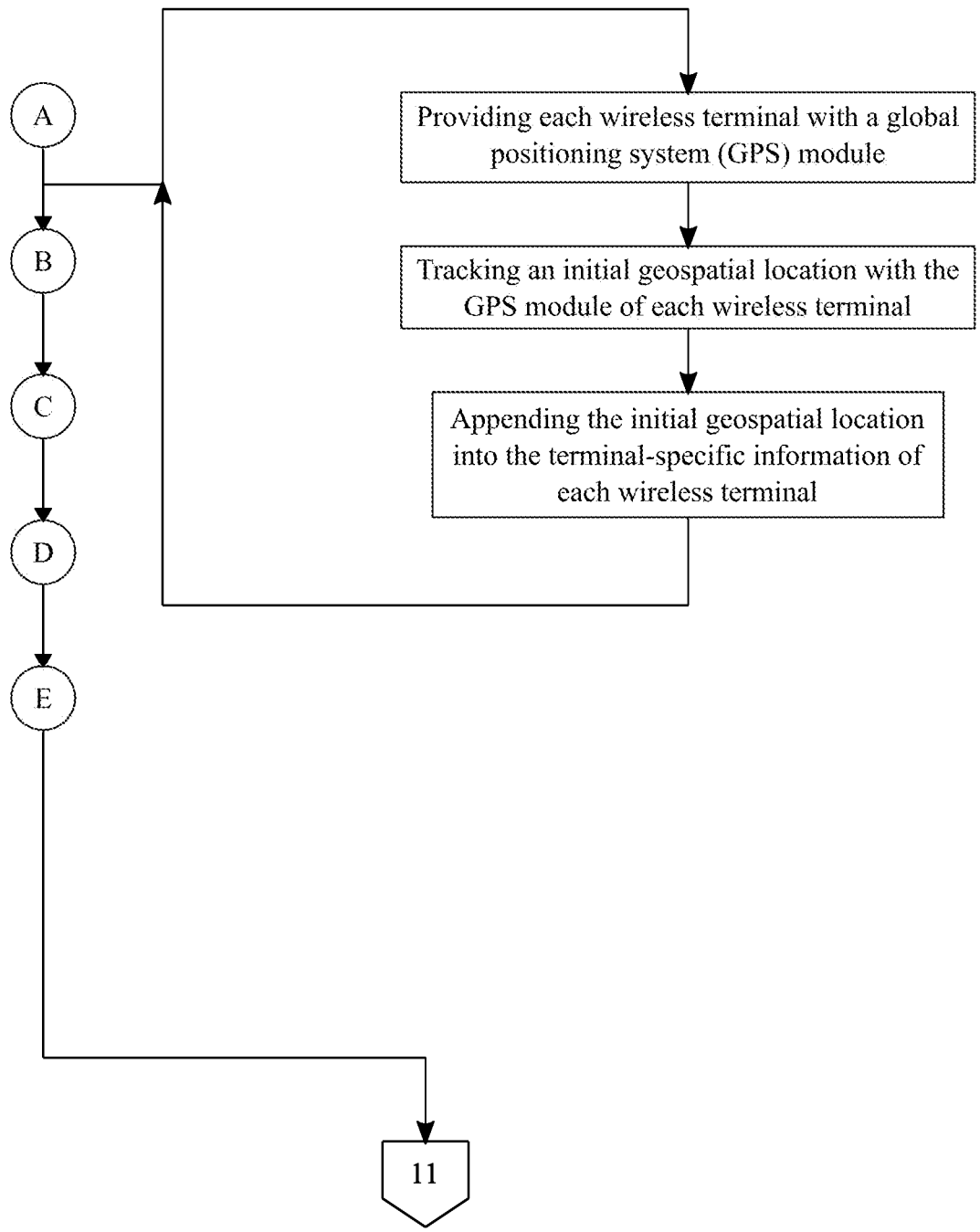
FIG. 10 is a flowchart of a subprocess appending the initial geospatial location into the terminal-specific information.

Referring to FIG. 7 and FIG. 10, as mentioned, in one possible embodiment, the location of the plurality of wireless terminals is derived from the corresponding GPS coordinates. As such, each wireless terminal is provided with a GPS module. The GPS module of each wireless terminal tracks an initial geospatial location. The initial geospatial location may include, but is not limited to, the X,Y coordinates of the wireless terminals. For example, for a MIMO radar, the initial geospatial location is constantly updated as the vehicle carrying the MIMO radar is constantly moving. Accordingly, the initial geospatial location is appended into the terminal-specific information for each wireless terminal.

Figure 11:
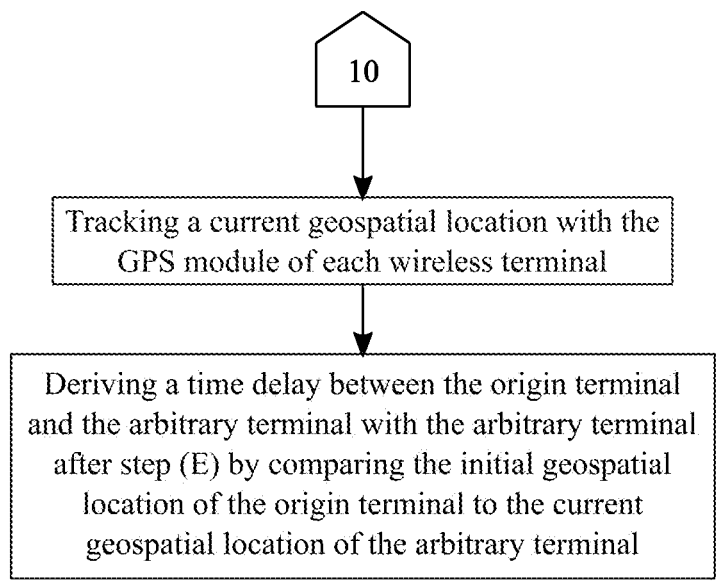
FIG. 11 is a flowchart of a subprocess for deriving the time delay between the origin terminal and arbitrary terminal with the current geospatial location and the initial geospatial location.
Figure 14:
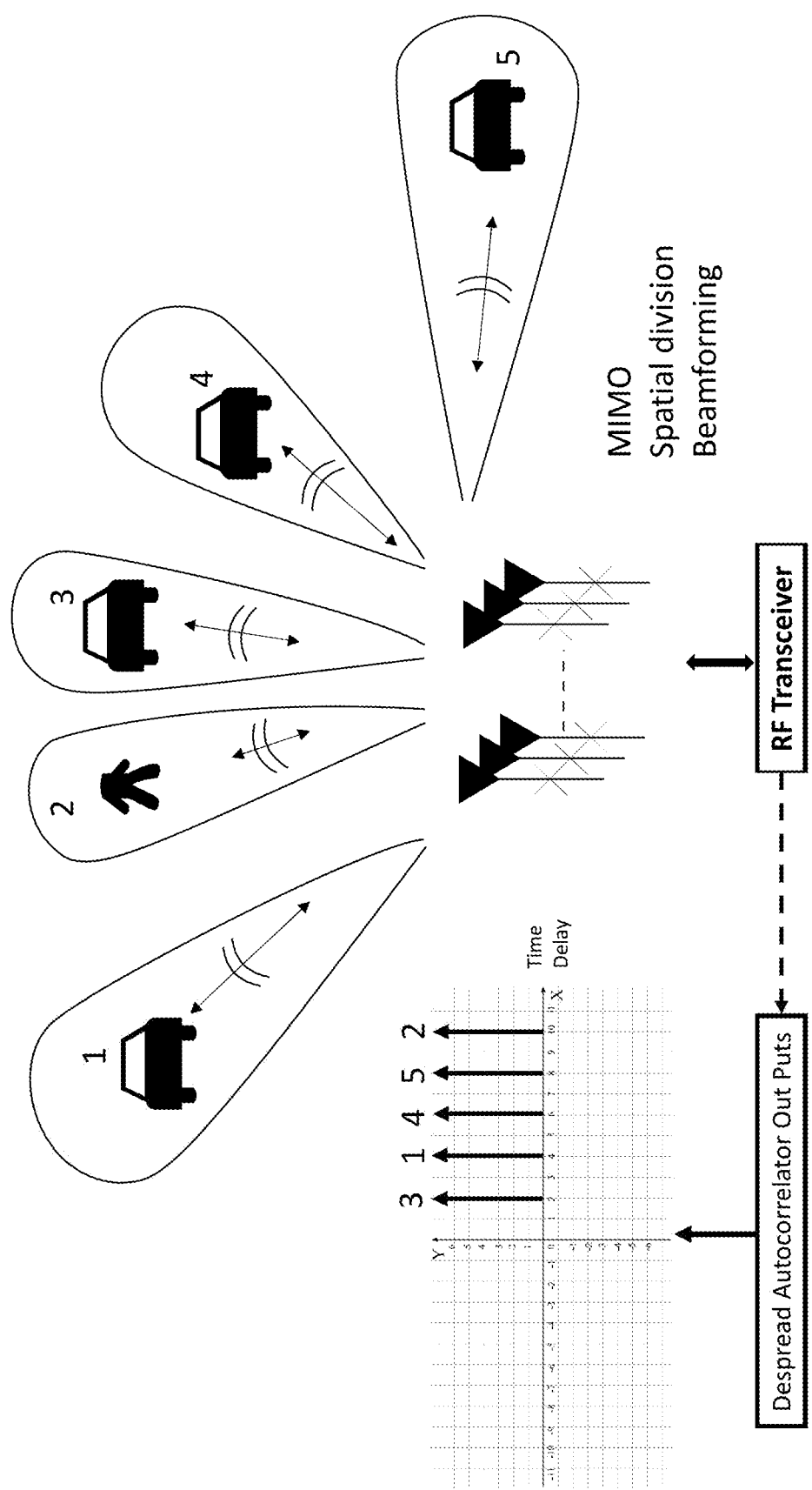
FIG. 14 is an illustration showing the MIMO radar calculating the time delay for a plurality of wireless terminals.

Referring to FIG. 11 and FIG. 14, as such, each wireless terminal also tracks a current geospatial location with the GPS module. Subsequently, the arbitrary terminal derives a time delay between the origin terminal and the arbitrary terminal after Step E by comparing the initial geospatial location of the origin terminal to the current geospatial location of the arbitrary terminal. More specifically, the time delay is determined by calculating the distance between the current geospatial location and the initial geospatial location. This also allows the arbitrary radar to locate the origin terminal.

Figure 12:
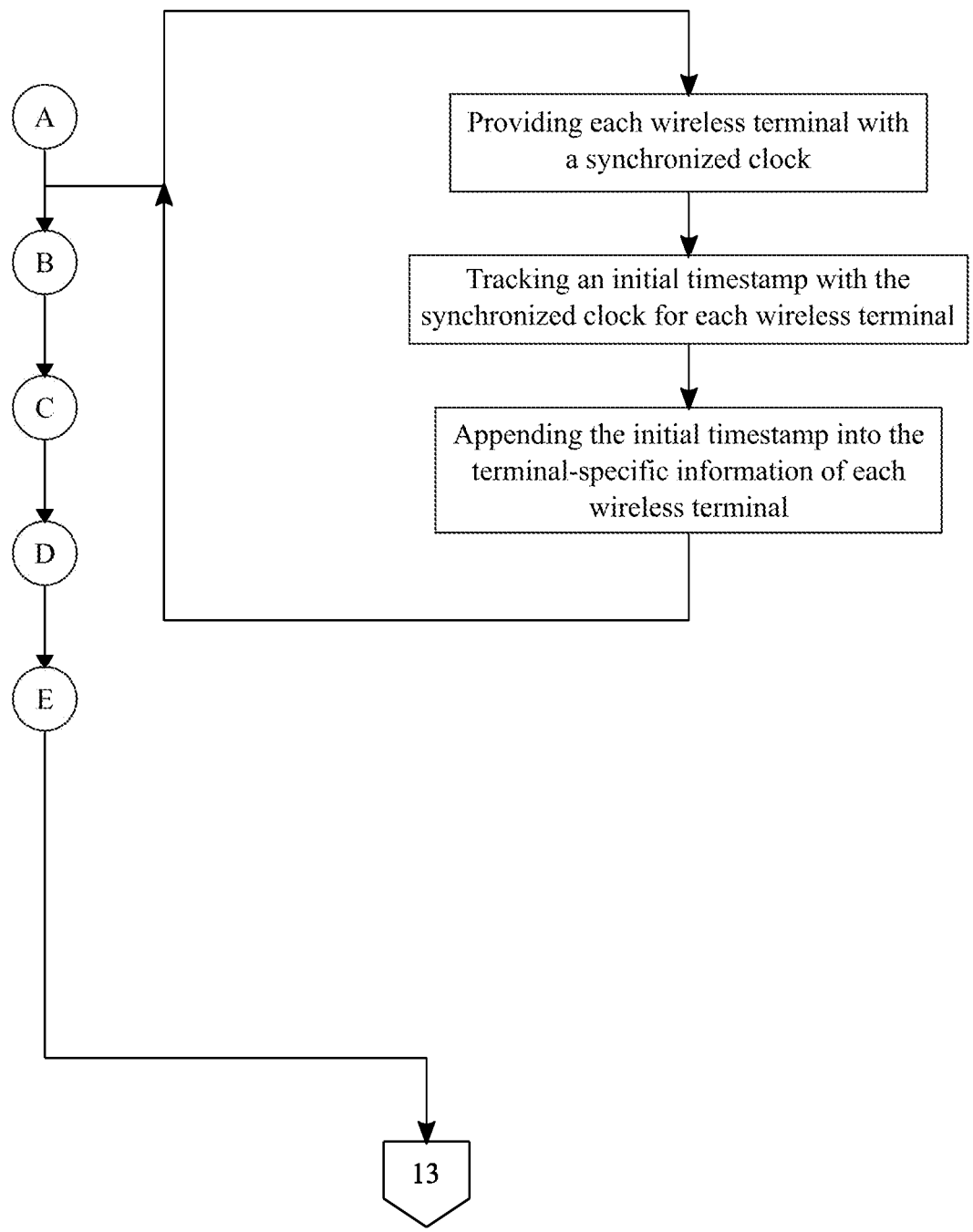
FIG. 12 is a flowchart of a subprocess for tracking an initial timestamp for each wireless terminal.

Referring to FIG. 12, in another embodiment, the location of the origin terminal is calculated using a timestamp during transmission. As such, each wireless terminal is provided with a synchronized clock. Subsequently, each wireless terminal tracks an initial timestamp with the synchronized clock. More specifically, the initial time stamp is taken at the time the beacon pilot signal is transmitted from the wireless terminal. Further, the initial timestamp is appended into the terminal-specific information of each wireless terminal. As such, each wireless terminal sends the initial timestamp through the beacon pilot signal.

Figure 13:
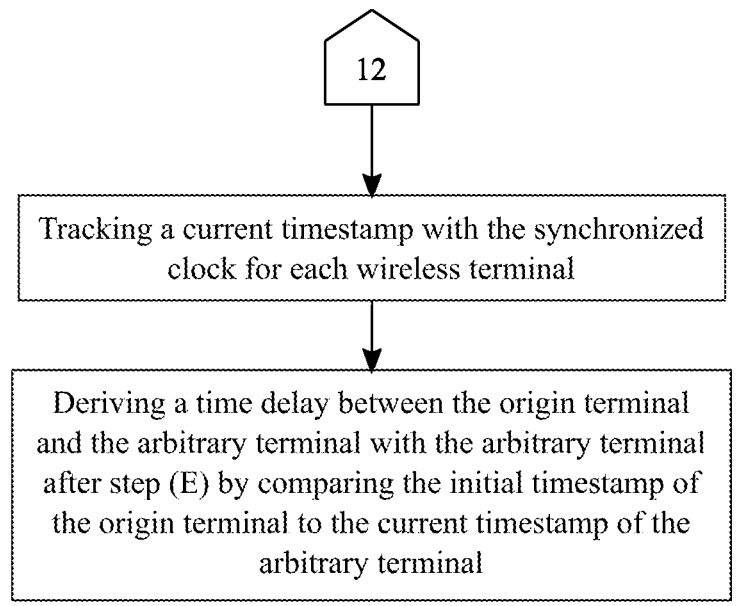
FIG. 13 is a flowchart of a subprocess for deriving a time delay from the current timestamp and the initial timestamp.

Referring to FIG. 13, when the arbitrary terminal receives the beacon pilot signal from the origin terminal, the initial timestamp is compared to a current timestamp. As such, the synchronized clock for each wireless terminal tracks a current timestamp. The current timestamp is an instantaneous time as measured by the synchronized clock. This allows the arbitrary terminal to derive a time delay between the origin terminal and the arbitrary terminal after Step E by comparing the initial timestamp of the origin terminal to the current timestamp of the arbitrary terminal. The time delay is used to calculate the distance traveled by the beacon pilot signal and thus the location of the origin terminal in relation to the arbitrary radar.

Figure 15:
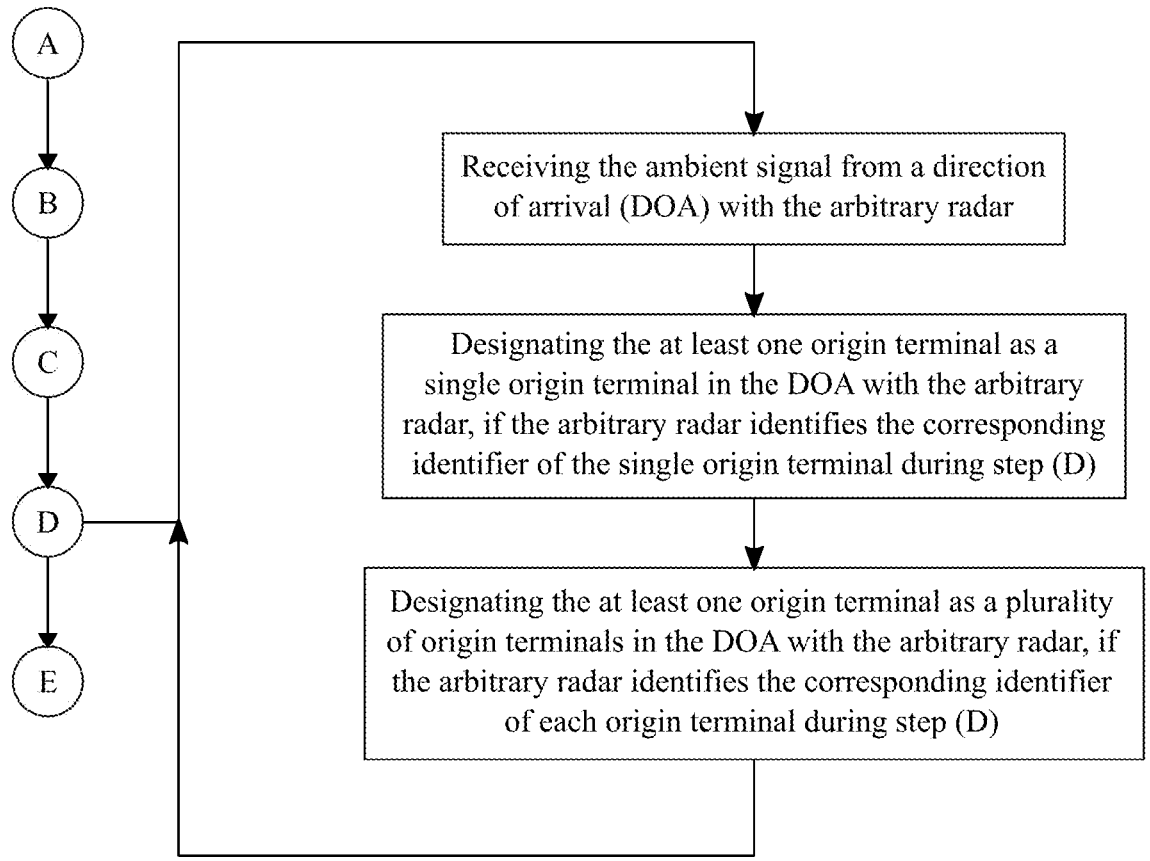
FIG. 15 is a flowchart of a subprocess for detecting the origin terminal using the direction of arrival DOA and the corresponding identifier.
Figure 16:
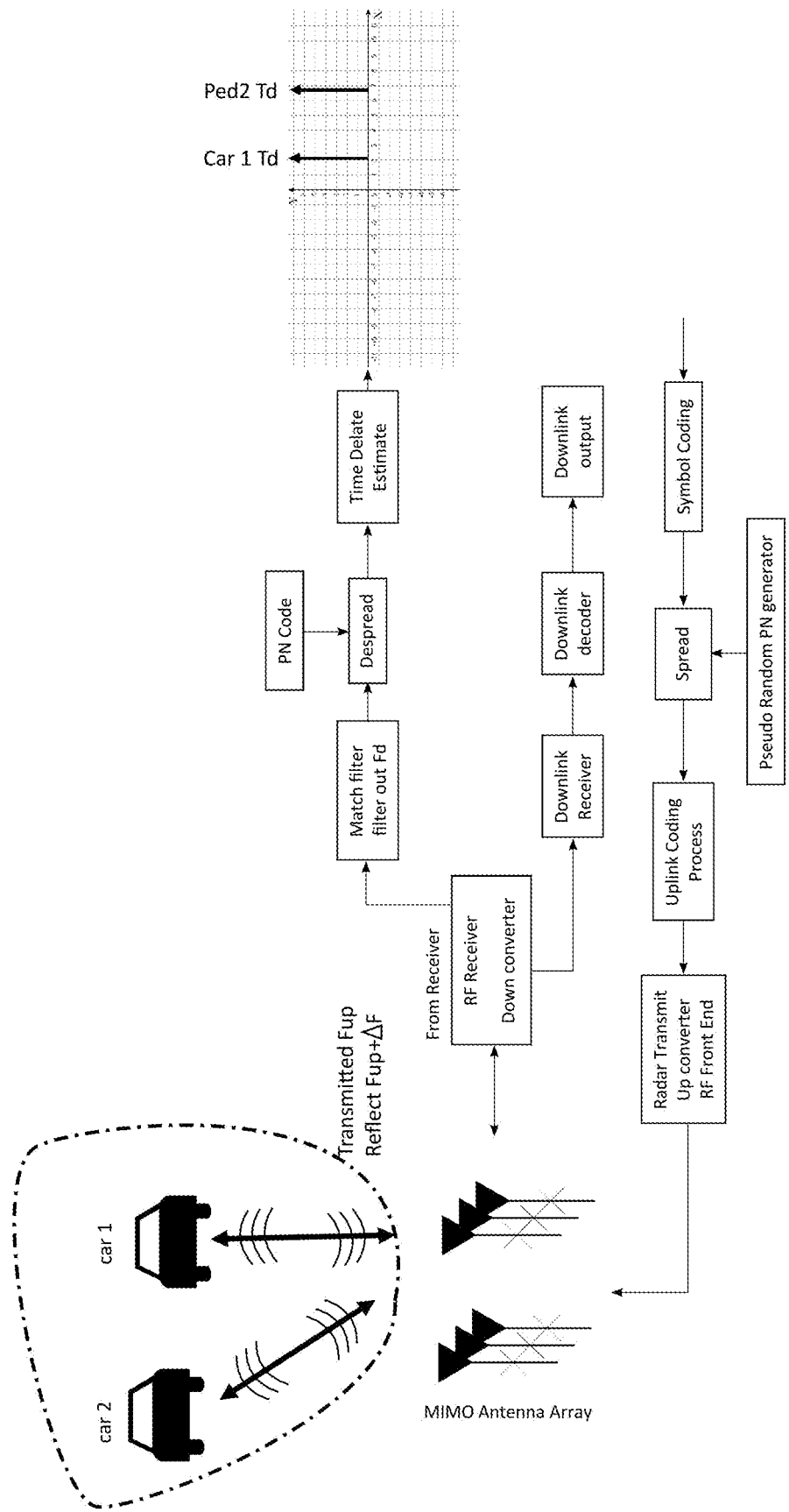
FIG. 16 is an illustration showing the MIMO radar detecting a plurality of origin terminals within the same DOA.

Referring to FIG. 15 and FIG. 16, in yet another embodiment, the MIMO directional receiving capability of the arbitrary radar is used to determine the location of the origin terminal. As such, the arbitrary radar receives the ambient signal from a direction of arrival (DOA). This is achieved by spatially filtering the ambient signal with the MIMO antenna of the arbitrary array and generating the respective DOA. The arbitrary radar designates the at least one origin terminal as a single origin terminal in the DOA, if the arbitrary radar identifies the corresponding identifier of the single origin terminal during Step D. In particular, the arbitrary radar can detect the origin radar by comparing the terminal-identifier information with the DOA. This can used to confirm the location of the origin terminal. Further, the arbitrary radar designates the at least one origin terminal as a plurality of origin terminals in the DOA, if the arbitrary radar identifies the corresponding identifier of each origin terminal during Step D. This allows the arbitrary radar to separate a plurality of origin terminals located in the same DOA.

In yet another embodiment, the plurality of MIMO radars is used as an active radar. In this embodiment, the beacon pilot signal reflects towards the MIMO radar which first transmitted the beacon pilot signal. Accordingly, the MIMO radar derives the spatial coordinates of the surrounding wireless terminals and objects from the reflected beacon pilot signal.

Although the invention has been explained in relation to its preferred embodiment, it is to be understood that many other possible modifications and variations can be made without departing from the spirit and scope of the invention as hereinafter claimed.

What is claimed is:

1. A method of environmental sensing through pilot signals in a spread spectrum wireless communication system, the method comprises the steps of:
   (A) providing a plurality of wireless terminals, wherein the plurality of wireless terminals includes a plurality of multi-input multi-output (MIMO) radars and at least one base station, and wherein each wireless terminal stores a plurality of terminal identifiers, and wherein each wireless terminal is associated to a corresponding identifier from the plurality of terminal identifiers;
   (B) broadcasting a beacon pilot signal with each wireless terminal, wherein the beacon pilot signal includes the corresponding identifier and terminal-specific information;

providing each wireless terminal with a pseudo-noise (PN) generator;
embedding the terminal-specific information into a frequency spectrum of the beacon pilot signal of each wireless terminal;
generating a public PN code with the PN generator of each wireless terminal, wherein the public PN code of each wireless terminal is the corresponding identifier;
spreading the frequency spectrum of the beacon pilot signal in accordance to the public PN code of each wireless terminal during step (B);

(C) receiving an ambient signal with at least one arbitrary radar, wherein the arbitrary radar is any radar from the plurality of MIMO radars;

(D) comparing the ambient signal to the corresponding identifier of each wireless terminal with the arbitrary radar in order to identify at least one origin terminal from the plurality of wireless terminals; and (E) processing the ambient signal as the beacon pilot signal of the origin terminal with the arbitrary radar in order to extract the terminal-specific information from the beacon pilot signal of the origin terminal, after the arbitrary radar identifies the origin terminal in step (D).

2. The method of environmental sensing through pilot signals in a spread spectrum wireless communication system, the method as claimed in claim 1 comprises the steps of:
providing a public PN code for each wireless terminal, wherein the public PN code is the corresponding identifier of each wireless terminal;
de-spreading a frequency spectrum of the beacon pilot signal of the origin terminal with the arbitrary radar in accordance to the public PN code of the origin terminal; and
extracting the radar-specific information from the frequency spectrum of the beacon pilot beam of the origin terminal with the arbitrary radar during step (E).

3. The method of environmental sensing through pilot signals in a spread spectrum wireless communication system, the method as claimed in claim 2 comprises the steps of:
estimating a time delay between the origin terminal and the arbitrary terminal with the arbitrary terminal after step (E) by counting a PN shift number for the frequency spectrum of the beacon pilot beam of the origin terminal.

4. The method of environmental sensing through pilot signals in a spread spectrum wireless communication system, the method as claimed in claim 1 comprises the steps of:
providing each wireless terminal with a pseudo-noise (PN) generator;
embedding secret information into a frequency spectrum of the beacon pilot signal of at least one specific terminal, wherein the specific terminal is from the plurality of wireless terminals;
generating a private PN code with the PN generator of the specific terminal; and
spreading the frequency spectrum of the beacon pilot signal in accordance to the private PN code of each wireless terminal during step (B).

5. The method of environmental sensing through pilot signals in a spread spectrum wireless communication system, the method as claimed in claim 1 comprises the steps of:

providing a private PN code for the origin terminal;
de-spreading a frequency spectrum of the beacon pilot beam of the origin terminal with the arbitrary radar in accordance to the private PN code of the origin terminal, if the private PN code for the origin terminal is stored on the arbitrary terminal; and
extracting secret information from the frequency spectrum of the beacon pilot beam of the origin terminal with the arbitrary beacon during step (E).

6. The method of environmental sensing through pilot signals in a spread spectrum wireless communication system, the method as claimed in claim 1 comprises the steps of:
providing each wireless terminal with a global positioning system (GPS) module;
tracking an initial geospatial location with the GPS module of each wireless terminal; and
appending the initial geospatial location into the terminal-specific information of each wireless terminal.

7. The method of environmental sensing through pilot signals in a spread spectrum wireless communication system, the method as claimed in claim 6 comprises the steps of:
tracking a current geospatial location with the GPS module of each wireless terminal; and
deriving a time delay between the origin terminal and the arbitrary terminal with the arbitrary terminal after step (E) by comparing the initial geospatial location of the origin terminal to the current geospatial location of the arbitrary terminal.

8. The method of environmental sensing through pilot signals in a spread spectrum wireless communication system, the method as claimed in claim 1 comprises the steps of:
providing each wireless terminal with a synchronized clock;
tracking an initial timestamp with the synchronized clock for each wireless terminal; and
appending the initial timestamp into the terminal-specific information of each wireless terminal.

9. The method of environmental sensing through pilot signals in a spread spectrum wireless communication system, the method as claimed in claim 8 comprises the steps of:
tracking a current timestamp with the synchronized clock for each wireless terminal; and
deriving a time delay between the origin terminal and the arbitrary terminal with the arbitrary terminal after step (E) by comparing the initial timestamp of the origin terminal to the current timestamp of the arbitrary terminal.

10. The method of environmental sensing through pilot signals in a spread spectrum wireless communication system, the method as claimed in claim 1 comprises the steps of:
receiving the ambient signal from a direction of arrival (DOA) with the arbitrary radar;
designating the at least one origin terminal as a single origin terminal in the DOA with the arbitrary radar, if the arbitrary radar identifies the corresponding identifier of the single origin terminal during step (D); and
designating the at least one origin terminal as a plurality of origin terminals in the DOA with the arbitrary radar, when the arbitrary radar identifies the corresponding identifier of each origin terminal during step (D).

* * * * *